E. A. HENSAL.
COMBINED DISHPAN AND RINSER.
APPLICATION FILED JULY 12, 1920.
1,356,362.   Patented Oct. 19, 1920.
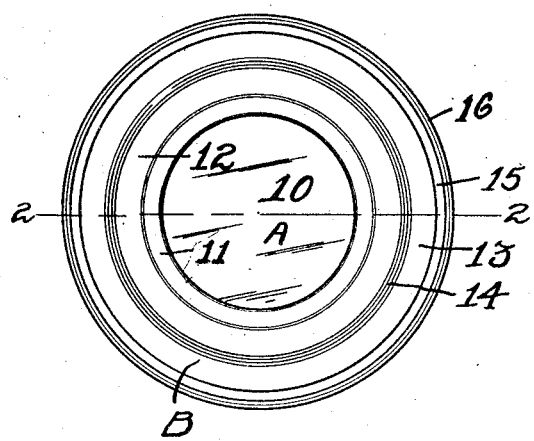
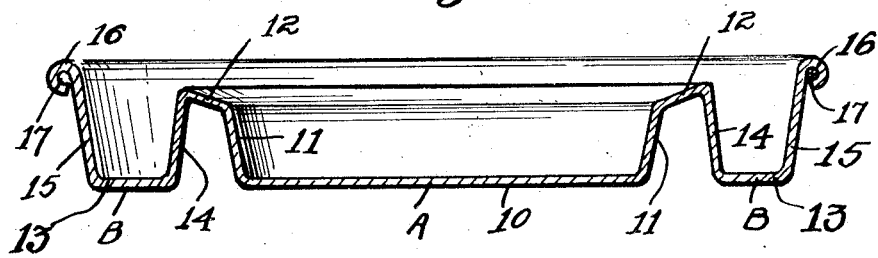
Inventor
Elmer A. Hensal
By Bair & Freeman
Attorneys

UNITED STATES PATENT OFFICE.

ELMER A. HENSAL, OF PANORA, IOWA.

COMBINED DISHPAN AND RINSER.

1,356,362.  Specification of Letters Patent.  Patented Oct. 19, 1920.

Application filed July 12, 1920. Serial No. 395,802.

*To all whom it may concern:*

Be it known that I, ELMER A. HENSAL, a citizen of the United States, and resident of Panora, in the county of Guthrie and State of Iowa, have invented a certain new and useful Combined Dishpan and Rinser, of which the following is a specification.

The object of my invention is to provide a device whereby dishes may be washed and rinsed in practically the same pan, without the necessity of removing the dish-water, its parts being of simple, durable and inexpensive construction.

Ordinarily dishes are first washed with soap or other cleaning compound in a pan, and are then placed upon a drain. The dishes are then placed within the pan again, and boiling hot water is poured over them, so that it may cut any of the grease or soap which may be on the dishes. After the pouring of the hot water over the dishes, they are readily and easily dried.

My device comprises a dishpan portion and an annular channel-shaped portion fixed on the dishpan portion. The dishpan portion being used for washing the dishes, while the channel-shaped portion is used to contain or hold the dishes after they have been washed in the dishpan portion. While the dishes are in the channel-shaped portion, the hot water is poured over them. The channel-shaped portion is so arranged that when the water is poured into it and after it has reached a certain height, the surplus water will pass into the dishpan portion, thus preventing any overflow of the channel-shaped portion, which may be properly called the rinsing portion of the device.

Still another object is to provide in such a device, between the dishpan portion and the rinsing portion, an inclined flange, so that when the dishwater is poured out of the dishpan portion, it will pass over the outer edge of the rinsing portion. My device may preferably be made of a blank of metal, so that it will be easy to manufacture and at a comparative low cost.

With these and other objects in view, my invention consists in the construction, arrangement and combination of the various parts of the device, whereby the objects contemplated are attained as hereinafter more fully set forth, pointed out in my claim, and illustrated in the accompanying drawings, in which:

Figure 1 shows a top plan view of my device, and

Fig. 2 shows a similar sectional view taken on line 2—2 of Fig. 1.

In the accompanying drawings, I have used the reference character A to indicate the dishpan portion, and the character B to indicate the rinsing portion of my device.

The portion A is provided with a bowl member 10, which is provided with the upwardly inclined sides 11, so that a bowl-shaped portion is formed. Extending upwardly and outwardly from the upper edges of the sides 11 is the annular flange 12, the purpose of which will be hereinafter more fully set forth.

The channel-shaped or rinsing portion B is formed on the outer edge of the flange 12 and is provided with a bowl 13, which is substantially in line with the bowl 10 of the portion A. Extending upwardly from the bowl 13 and inclined therefrom, is the inner wall member 14. An outer wall member 15 is provided on the rinsing portion B. The upper edge of the wall member 15 is balanced upon itself at 16, so as to engage and receive the wire member 17.

It will be seen that the engaging of the portion 16 with the wire member 17 will tend to reinforce the upper edge of the device and also tend to serve as a handle portion whereby the device may be engaged for moving from place to place.

After the dishes are washed within the portion A, they are placed upon edge within the rinsing portion B. After all the dishes have been washed and placed around the portion A, and within the rinsing portion B, hot water is used for rinsing the dishes.

From Fig. 2 of the drawings it will be seen that the inner wall 14 is substantially lower than the outer wall 15, so that when water is poured into the rinsing portion and reaches a certain height it will then pass into the portion A.

After the dishes have been washed, rinsed and dried, it is then necessary to empty the device of its water. Inclining the device will cause the water from the portion A to pass over the flange 12, which will act as a gateway for causing the water from the dishpan portion A to pass out without coming in contact with the upper edge of the wall 15 of the rinsing portion B.

This is very important, because it is undesirable to have the greasy water that would ordinarily be within the portion A from coming in contact with the other parts of my device. The flange 12 prevents the greasy water from contacting with the parts of the device that is ordinarily used as a rinsing portion.

The advantages of my device are that I am able to wash the dishes, place them upon edge, rinse them practically in the same pan, at the same time, without moving the dishes from place to place or from pan to pan. This saves a great deal of labor and inconvenience in the ordinary kitchen.

Some changes may be made in the construction and arrangement of the parts of my improved device without departing from the essential features and purposes of my invention, and it is my intention to cover by my claim any modified forms of structure or use of mechanical equivalents which may be reasonably included within their scope.

I claim as my invention:

In a device of the class described, a bowl-shaped center member having a radially, outwardly extending flange formed thereon, said flange being inclined upwardly from its inner edge toward its outer edge, and a channel-shaped portion formed on the outer edge of said flange.

ELMER A. HENSAL